United States Patent Office 3,314,892
Patented Apr. 18, 1967

3,314,892
STABILIZATION OF HALOHYDROCARBONS
George Whitlock Graham, Beloeil Station, Quebec, Canada, assignor to Canadian Industries Limited, Montreal, Quebec, Canada, a corporation of Canada
No Drawing. Filed Sept. 18, 1961, Ser. No. 138,564
Claims priority, application Canada, Oct. 27, 1960, 809,883
3 Claims. (Cl. 252—153)

This invention relates to the stabilization of halogenated hydrocarbons and, more particularly, to the inhibition of the decomposition of trichloroethylene encountered in metal degreasing.

In vapour degreasing operations, trichloroethylene is continuously boiled and is thus subject to heat and contamination from the metal parts being degreased. This contamination is usually caused by metal chips, water, cutting oils, buffing compounds and the like, normally used in metal machining operations.

Under these conditions, trichloroethylene undergoes decomposition very rapidly with the formation of acidic compounds which are corrosive to the degreasing equipment and also act as catalysts for the further decomposition of the solvent.

It has long been common practice to add stabilizers to trichloroethylene degreasing solvents and, in particular, organic amines have long been used for this purpose. More recently, it has been claimed, for example in United States Patent No. 2,797,250, that there exists a synergistic combination of amines with certain organic epoxides, and that this combination is especially effective in stabilizing trichloroethylene against decomposition and acid formation by heat.

As far as is known, it has not hitherto been suggested that organic quaternary ammonium compounds should be used as stabilizers for halogenated hydrocarbon degreasing solvents. It has now been discovered that these compounds can be used in extremely effective stabilizing systems; not, indeed, by themselves, but in a synergistic relationship with other known stabilizers.

It is thus an object of this invention to provide a new method of stabilizing halogenated hydrocarbon degreasing solvents. A further object is to provide such solvents stabilized by a new three component stabilizing system, with or without other known stabilizers. Additional objects will appear hereinafter.

The new method of this invention comprises incorporating with halogenated hydrocarbon degreasing solvents at least one organic amine in an amount between 0.0005% and 0.2% by weight, at least one volatile epoxy compound in an amount between 0.01% and 1.0% by weight and at least one organic quaternary ammonium compound in an amount between 0.0005% and 0.2% by weight.

The stabilizing method of this invention applies to all halogenated hydrocarbons used as vapour degreasing solvents and, particularly, to trichloroethylene and methyl chloroform.

The organic amine used as one member of the new stabilizing system of this invention may be any basic amine such as the pyridines or picolines, or straight or branched chain aliphatic or aromatic amines such as triethylamine, diisopropylamine, aniline, dimethyl aniline or N-alkyl morpholines. The necessary properties of the amine stabilizer are: (1) it must be soluble in the solvent, (2) it must possess sufficient volatility to be distilled with the solvent, and (3) it must react with HCl in chlorinated hydrocarbon solution. Suitable amounts of amine range from about 0.0005% to 0.2% by weight of the solvent; the lower amounts (below 0.001%) are usually useful only in the presence of other stabilizing species, such as N-methyl pyrrole, discussed hereinafter.

The volatile epoxy compounds suitable for the purpose of this invention contain the three membered epoxy ring:

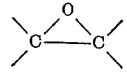

and must be of a molecular weight such that they retain at least some volatility at the boiling point of the solvent but are not so volatile as to escape from the degreasing system. Suitable epoxy compounds include propylene oxide, butylene oxide, styrene oxide, cyclohexene oxide, epichlorhydrin, the 2-methylbutene oxides, butadiene dioxide, hexylene, heptylene and octylene oxides, α-methylstyrene oxides, α-pinene oxide, limonene monoxide and limonene dioxide. They are suitably used in an amount between 0.01% and 1.0% by weight.

The suitable organic quaternary ammonium compounds have the formula:

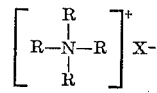

wherein the substituents R are not necessarily all the same and normally represent alkyl or alkenyl groups having up to 20 carbon atoms which may contain branched chains or non-functional substituents that do not effect the quaternary character of the salt. At least one R may also be an aromatic group, as in benzyl trimethyl ammonium salts. In addition two or more R substituents may together with the nitrogen atom form a cyclic aliphatic or aromatic structure, as in dimethyl piperidinium bromide and cetyl pyridinium bromide. The anion X⁻ may be hyrdoxyl, or a halide anion such as the fluoride, chloride, bromide or iodide anion, or an organic or inorganic acid anion such as the acetate, nitrate, or sulphate anion. The quaternary compounds should be present in an amount between 0.005% and 0.2% by weight.

It can thus be seen that a very large number of quaternary ammonium compounds can each successfully be used as one member of the stabilizing system of this invention. An exhaustive list of said compounds would be of encyclopaedic dimensions, and thus the compounds have been defined by reference to the above formula.

The synergistic effect of the three essential ingredients of the stabilizing system will be demonstrated by the following examples wherein it is shown that the three together are far more effective than each singly or any two together. However, it has also been found that a further improvement can be obtained by adding to the system other known stabilizers such as N-methyl pyrrole or isopropanol. Thus, the invention includes degreasing solvents containing not only the three essential synergistic stabilizers, but also the three together with one or more other known stabilizers. The resulting level of stability is far above that required in the great majority of industrial degreasing applications, but it may be found to be economical to sell only one grade of highly stable solvent to all users in order to cope with the few who need the highest available stability.

The examples only illustrate the invention by means of specific modifications and the invention is not limited to these modifications but only by the appended claims.

In all the examples the test procedure was the following. A pH measuring was used consisting of a 500 ml. flask, a reflux condenser and a glass water trap located between the condenser and the flask. Two pH electrodes dipped into this water and were connected to a recorder. Trichloroethylene (as a typical solvent, except in Example 6) was boiled in the flask and the condensate allowed to flow continuously through the water layer so that changes in the pH of the solvent were passed on to the water layer and a continuous record of the solvent pH obtained. In order to accelerate the decomposition of the solvent it was exposed to ultraviolet light and oxygen was bubbled through the liquid which contained samples of iron wire and a cutting oil. The experiments involved recording the time for the pH to decrease to 7 and then, usually quite rapidly, to 5. In a commercial degreaser a pH of 7 is critical, while a pH of 5 begins to cause serious corrosion and approaches the point where the violent condensation reaction of trichloroethylene starts.

*Example 2*

|  | Percent |
|---|---|
| Component 5, isopropanol | 0.004 |
| Component 6, N-methyl pyrrole | 0.01 |
| and |  |
| Component 7, diisobutylene | 0.15 |

It can be seen, however, that the omission of any one of the three essential synergists destroys the solvent stability despite the presence of the extra stabilizers (3 and 4 are alternative quaternaries).

TABLE III

| Stabilizing Component | | | | | | | Hours to pH 7 | | Hours to pH 5 | |
|---|---|---|---|---|---|---|---|---|---|---|
| 1 | 2 | 3 | 4 | 5 | 6 | 7 | | | | |
| X | X | X | --- | --- | --- | --- | 12¼ | 13¼ | 14 | 13¼ |
| X | X | X | X | --- | --- | --- | 21¼ | 16¼ | 22¼ | 17¾ |
| X | X | X | X | --- | X | --- | pH of 8.2 after 24 hrs. | | | |
| X | X | --- | X | --- | --- | --- | 6¼ | 6¼ | 7¼ | 7 |
| --- | X | --- | --- | X | X | X | 4¼ | 3½ | 4¾ | 4 |
| X | --- | X | --- | --- | X | X | 3½ | 5¾ | 7¾ | 8 |
| X | X | X | --- | --- | X | --- | 25½ | 36¼ | 27¼ | 39¾ |
| X | --- | --- | X | X | X | --- | 58½ | 57 | 67½ | 64¼ |

*Example 1*

Table I demonstrates the essential synergistic action of the three components the presence of which is indicated by an X in the first column. Component 1 is butene oxide (0.25% by weight), component 2 is triethylamine (0.0025% by weight) and component 3 is cetyl trimethylammonium bromide (0.002% by weight). The last example in Table I is within the scope of this invention.

Each experiment was conducted in duplicate. Since the decomposition is autocatalytic, it has been found that a system which stabilizes for 10 hours is much more than twice as effective in commercial use as one which does so for only 5 hours.

TABLE I

| Stabilizing Component | | | Time to pH 7 in hours | | Time to pH 5 in hours | |
|---|---|---|---|---|---|---|
| 1 | 2 | 3 | | | | |
| --- | --- | X | --- | --- | 1 | 1 |
| --- | X | --- | 2 | 2¾ | 2¼ | 3 |
| X | --- | --- | --- | --- | ¾ | ½ |
| X | --- | X | --- | --- | ¾ | 1 |
| --- | X | X | 4 | 3½ | 4½ | 3¾ |
| X | X | --- | 7¼ | 6¾ | 8¼ | 8¼ |
| X | X | X | 12¼ | 13¼ | 14 | 13¼ |

In Table II, similar results are presented wherein the quaternary component 4 is a trimethyl ammonium chloride wherein the fourth alkyl substituent is the residue of coconut fatty acids, and is sold commercially as "Arquad C" (Armour Chemical Co.).

TABLE II

| Stabilizing Component | | | Time to pH 7 in hours | | Time to pH 5 in hours | |
|---|---|---|---|---|---|---|
| 1 | 2 | 4 | | | | |
| --- | --- | X | --- | --- | 1 | 1 |
| X | --- | X | --- | --- | 4½ | 5½ |
| --- | X | X | 2½ | 3¼ | 4 | 3½ |
| X | X | X | 18 | 18 | 19½ | 19½ |

In Table III, results are shown showing the beneficial effect of the addition of other stabilizing components, in particular:

Suitable amounts of components 5, 6 and 7 are respectively .001%–1.0%, .002%–1.0%, and .05%–1.0%. It must be emphasized, however, that their use is optional.

*Example 3*

In Table IV, the effect of further quaternary ammonium compounds in the stabilized solvents of this invention is shown. Each sample contained components 1 and 2, and the particular quaternary used is named.

TABLE IV

| Quaternary Ammonium Compound, 0.002% by weight | Stability | | | |
|---|---|---|---|---|
|  | Hours to pH 7 | | Hours to pH 5 | |
| None | 4 | 5 | 4¾ | 5¼ |
| Tetraethyl ammonium iodide | 13¼ | 18¼ | 14¾ | 19¾ |
| Coco-trimethyl ammonium hydroxide | 13 | 11 | 15¼ | 13½ |
| Coco-trimethyl ammonium acetate | 10¾ | 12 | 14 | 15½ |
| Cetyl-trimethyl ammonium hydroxide | 14½ | 13½ | 16 | 15¼ |

It is to be noted that the quaternary ammonium salts need not be added as such to the solvent but may be prepared in situ. This is most readily accomplished by adding an alkyl halide and an amine to the solvent, the amine being possibly already present as component 2, and optionally more of it being added to react with the alkyl halide. This method of making the quaternary ammonium salts has the advantage that the two components distill separately from the sump of a degreaser and form the quaternaries after condensation in the degreasing system. Thus the only disadvantage of the quaternary stabilizers, i.e. their non-volatility, is overcome. In practice it has been found, however, that there is sufficient splash-over, in the rudimentary stills used in degreasing plants to separate the grease from the solvent, that sufficient of even a non-volatile quaternary gets back to the degreaser.

*Example 4*

In the Table V are shown the results of experiments wherein alkyl halides were used to react with amines to produce the quaternaries in situ. In each case 0.25% by weight of butene oxide (component 1) was added.

TABLE V

| Amine Component, Percent | Alkyl Halide, 0.002% | Hours to pH 7 | | Hours to pH 5 | | Hours to the same pH in the absence of the halide | | | |
|---|---|---|---|---|---|---|---|---|---|
| 0.00468 TEA | Butyl chloride | 6¾ | 8½ | 9 | 11¾ | 3¼ | 4 | 4¾ | 5½ |
| 0.0026 TEA | Butyl iodide | 7¾ | 5½ | 10¾ | 6½ | 4 | 4¼ | 6½ | 5 |
| 0.00282 DMA | do | 5¾ | 7¾ | 7½ | 8¾ | ¼ | ¼ | ½ | ½ |
| 0.0031 TEA | Cetyl iodide | 5½ | 5¾ | 7 | 7 | | | | |
| 0.00398 TEA | Butyl bromide | 7½ | 6¼ | 12 | 7¼ | | | | |
| 0.0047 DIPA | Butyl chloride | 10 | 9¾ | 11¼ | 10¾ | 4¾ | 5¾ | 5¾ | 6½ |

TEA = triethylamine.   DMA = dimethylaniline.   DIPA = diisopropylamine.

It is apparent from Example 4 that a wide range of alkly halides may be used with an amine to function as a member of the stabilizing system, apparently by producing a quaternary ammonium compound in situ. Any alkyl monohalide will work, but those of such high volatility as to be rapidly lost from a degreaser are of little practical use. Those whose boiling points are similar to that of the halogenated hydrocarbon degreasing solvent are preferred since they distill from the residue still pot of a degreaser and reform the active stabilizer. Suitable amounts of halide lie between 0.001% and 0.2% by weight. The following examples illustrate the effectiveness of butyl chloride (B.P. 78° C.) in this use.

Example 5

A combination of two epoxides was used, and this is in some cases to be preferred. The stability tests were run as in previous examples, and the solvent for distillation was mixed with 30% by weight of cutting oil and distilled at a temperature not exceeding 121° C. The latter is that available from 15 p.s.i.g. steam, used in most plants. The trichloroethylene was steam stripped from the residue and added to the distillate.

TABLE VI

| | Sample 1 | | Sample 2 | |
|---|---|---|---|---|
| Stabilizers in wt. percent: | | | | |
| Butene oxide | 0.25 | | 0.25 | |
| Styrene oxide | 0.1 | | 0.1 | |
| Triethylamine | 0.0047 | | | |
| Diisopropylamine | | | 0.0047 | |
| Butyl chloride | 0.004 | | 0.004 | |
| Stability before distillation: | | | | |
| Hours to pH 7 | 8½ | 9½ | 8½ | 10½ |
| Hours to pH 5 | 9 | 11 | 9½ | 12 |
| Stability after distillation: | | | | |
| Hours to pH 7 | 9 | 9½ | 8 | 9 |
| Hours to pH 5 | 9½ | 10 | 9½ | 10 |

Example 6

Similar experiments on another chlorinated hydrocarbon degreasing solvent, namely methyl chloroform, showed similar advantageous results.

Stabilizers:     Amount in percent by wt.
  Butene oxide _____ 0.25
  Triethylamine _____ 0.0025
  "Arquad C" _____ 0.002

Stability:
  Hours to pH 7 _____ 2½
  Hours to pH 5 _____ 6½
In the absence of "Arquad C":
  Hours to pH 7 _____ 1
  Hours to pH 5 _____ 1¾

What I claim is:

1. A degreasing solvent selected from the group consisting of trichloroethylene and methyl chloroform having incorporated therein (1) between 0.0005% and 0.2% by weight of at least one amine selected from the group consisting of triethylamine, dimethylaniline and diisopropylamine, (2) between 0.01% and 1.0% by weight of at least one vic-epoxy compound selected from the group consisting of butylene oxide and styrene oxide, and (3) between 0.0005% and 0.2% by weight of at least one quaternary ammonium compound selected from the group consisting of cetyl trimethyl-ammonium bromide, cetyl trimethyl-ammonium hydroxide, tetraethyl-ammonium iodide, coco-trimethyl-ammonium chloride, coco-trimethyl-ammonium acetate and coco-trimethyl-ammonium hydroxide.

2. A degreasing solvent selected from the group consisting of trichloroethylene and methyl chloroform having incorporated therein (1) between 0.0005% and 0.2% by weight of at least one amine selected from the group consisting of triethylamine, dimethylaniline and diisopropylamine, (2) between 0.01% and 1.0% by weight of at least one vic-epoxy compound selected from the group consisting of butylene oxide and styrene oxide, and (3) between 0.001% and 0.2% by weight of at least one alkyl monohalide selected from the group consisting of butyl chloride, butyl bromide, butyl iodide and cetyl iodide.

3. A degreasing solvent as claimed in claim 1 containing additionally a stabilizing amount of at least one compound selected from the group consisting of isopropanol, N-methyl pyrrole and diisobutylene.

References Cited by the Examiner
UNITED STATES PATENTS

| 2,435,312 | 2/1948 | Klabunde | 260—652.5 |
| 2,492,048 | 12/1949 | Klabunde | 260—652.5 |
| 2,797,250 | 6/1957 | Copelin | 260—652.5 |
| 2,973,392 | 2/1961 | Graham | 260—652.5 |
| 3,000,978 | 9/1961 | Fredenburg | 260—652.5 |

LEON ZITVER, *Primary Examiner.*

ALPHONSO D. SULLIVAN, DANIEL D. HORWITZ, *Examiners.*